Feb. 18, 1969
R. L. LICH
3,427,993
RAILWAY CAR AND SUPPORTING TRUCK
Filed May 13, 1966
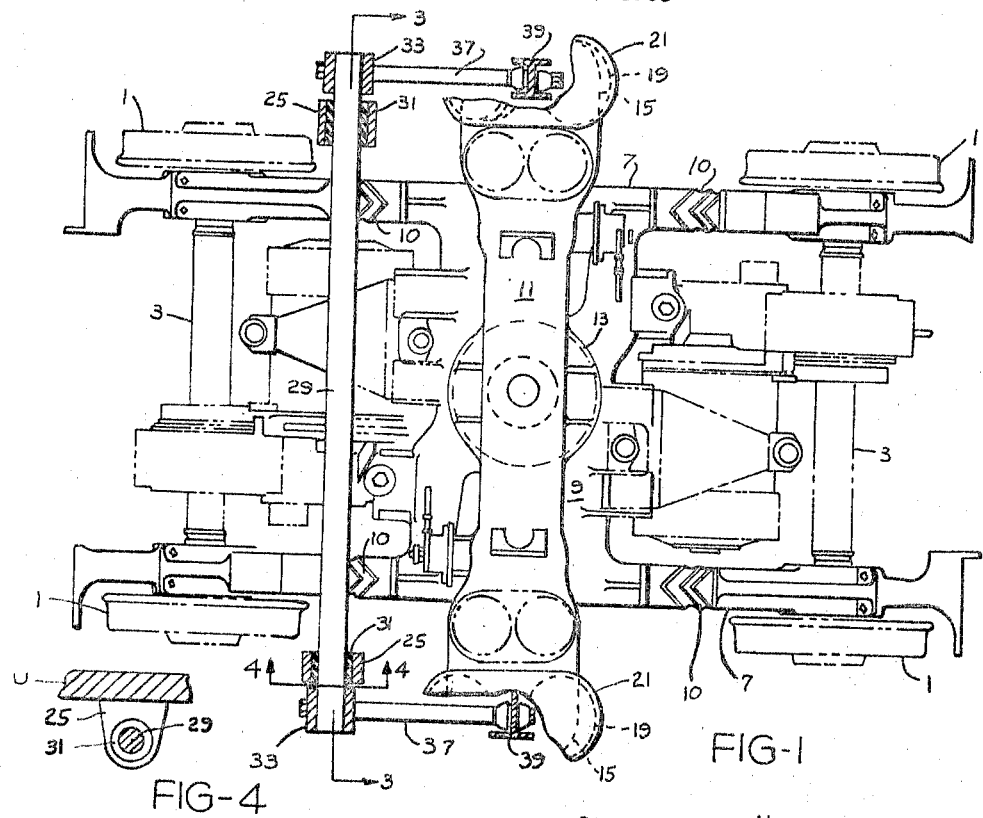
FIG-1
FIG-4
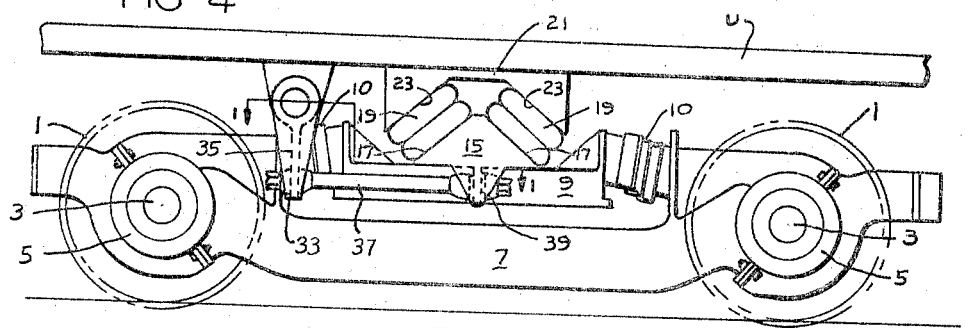
FIG-2
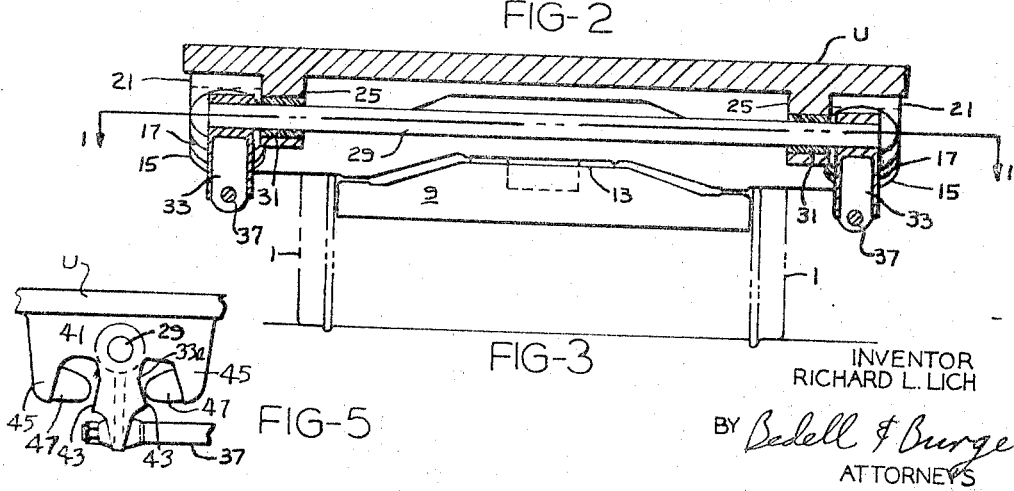
FIG-3
FIG-5
INVENTOR
RICHARD L. LICH
BY *Bedell & Burgess*
ATTORNEYS

United States Patent Office 3,427,993
Patented Feb. 18, 1969

3,427,993
RAILWAY CAR AND SUPPORTING TRUCK
Richard L. Lich, Pasadena Hills, Mo., assignor to General Steel Industries, Inc., Granite City, Ill., a corporation of Delaware
Filed May 13, 1966, Ser. No. 549,919
U.S. Cl. 105—199
Int. Cl. B61f 5/06
10 Claims

ABSTRACT OF THE DISCLOSURE

Railway vehicle truck structure of the type in which a transverse bolster is swivelly mounted on the truck framing and supports the car body by springs seated on the bolster at the sides of the truck. To cushion longitudinal forces between the bolster and car body and to aid in the transmission of such forces therebetween, the axes of the body support springs at each side are oppositely included longitudinally of the truck. For transmitting longitudinal draft forces from the bolster to the underframe and also for cushioning the transmission of such forces the underframe mounts a transversely extending torsion bar having downwardly extending arms at its ends, the arms being connected to the bolster by longitudinally extending anchors at each side of the truck. The torsion bar is journaled in resilient bushings at the sides of the truck which yieldingly oppose its rotation, but its continuity transversely of the truck assures that both ends will rotate substantially in unison and thus avoid swiveling of the bolster relative to the underframe which might occur if the anchor arms at each side were independently connected to the underframe.

---

The invention relates to railway rolling stock and consists particularly in means for cushioning the transmission or acceleration and retardation forces between a railway vehicle truck and the vehicle body supported thereon.

In trucks of the type in which the bolster is supported on the truck frame for pivoting about a vertical axis, and supports the vehicle body by upright springs for relative transverse and vertical movements, longitudinal forces are transmitted between the bolster and body and relative longitudinal and swiveling movements between them are prevented by longitudinally extending anchor links at each side of the vehicle, each secured at one end to an end of the bolster and at the other end to bracket structure rigidly depending from the vehicle body.

With this arrangement, acceleration and retardation forces are transmitted directly from the truck to the car body. If acceleration and deceleration rates are high, they may cause considerable discomfort to occupants of the car.

It accordingly is a main object of the invention to provide means for cushioning the transmission of longitudinal forces between a railway vehicle truck and the car body supported thereon.

A further object is to provide longitudinal force transmitting means between a railway vehicle truck and body which will maintain the truck bolster in transverse, relation with the body of a supported vehicle irrespective of the application of different longitudinal forces to each side of the truck.

The foregoing and additional more detailed objects and advantages are achieved by the construction described below and illustrated in the accompanying drawings, in which:

FIG. 1 is a top view of a railway car truck and associated body structure embodying my invention, partially horizontally sectionalized along lines 1—1 of FIGS. 2 and 3.

FIG. 2 is a side elevation view of the construction illustrated in FIG. 1.

FIG. 3 is a transverse vertical sectional view along line 3—3 of FIG. 1.

FIG. 4 is a fragmentary longitudinal sectional view along line 4—4 of FIG. 1.

FIG. 5 is a fragmentary side elevation of a modified from the invention.

The truck comprises flange wheels 1 mounted on space axles 3, on which are mounted journal boxes 5 inboard of the wheels. Longitudinally extending side frames 7 are supported on journal boxes 5 and resiliently support transverse frame 9 by means of longitudinally outwardly and upwardly inclined rubber pads 10 preferably of chevron or V cross section. Intermediate its ends, transverse frame 9 pivotally supports transverse bolster 11 for swiveling movement about a vertical axis.

The extremities 15 of bolster 11 protrude transversely from the truck side frames 7 and transverse frame 9 and are formed with a gable top of generally inverted V cross section, with converging top surfaces 17 inclined lengthwise of the truck. Flexible wall pneumatic springs 19 are seated on the bolster top surfaces 17 with their axes normal to surfaces 17. A spring cap member 21 having similarly inclined downwardly facing surfaces 23 rests on and it secured to the upper surfaces of springs 19. The upper surface of cap 21 is secured to underframe U, springs 19 are yieldable axially and in shear and, because of their inclination lengthwise of the truck, they will resist not only vertical loads, but longitudinal loads as well while accommodating, through deflection in shear, sufficient lateral movement of the vehicle body relative to the truck bolster to absorb lateral forces which the truck may receive from the track structure.

For maintaining the bolster in its normal position transverse of the vehicle underframe at all times, irrespective of swiveling movements of the truck itself responsive to curvature in the track, and for transmitting longitudinal forces from the truck to the vehicle underframe, the latter is provided with a pair of depending brackets 25 positioned transversely outwardly of the truck side frame and spaced lengthwise of the truck from bolster 11. Brackets 25 are circularly apertured at 27, and a transversely extending shaft 29 passes through and is journalled in apertures 27 of brackets 25, the schaft being of substantially less diameter than apertures 27.

Rubber or similar elastomeric bushings 31 are forcefitted into the annular spaces between shaft 29 and brackets 27, whereby, through torsional shear, to accommodate yet yieldingly resist rotation of shaft 29. Outwardly of brackets 25 depending arms 33 are rigidly secured to the outer ends of shaft 29. Arms 33 include plate-like webs 35, to the lower end portion of which are secured for limited pivotal movement an end of a longitudinally extending anchor link 37 of the type disclosed in James C. Travilla application, Ser. No. 146,969 filed Oct. 23, 1961, now Patent Number 3,254,611, issued June 7, 1966, the opposite ends of anchor links 37 being similarly secured to a plate-like bracket 39 depending from the end portions 15 of bolster 11, the latter point of securement coinciding substantially with the intersection of the normals of springs 19, 19.

From the foregoing it will be evident that acceleration and deceleration forces will be transmitted from the bolster to the vehicle underframe by means of anchor link 37, arms 33, elastomeric bushings 31, and brackets 25. Some cushioning of these forces will be provided by the resiliency in torsional shear of bushings 31. However, the rigid mounting of arms 33 on the ends of shaft 29 will assure that arms 33 will move similarly to the extent that shaft 29 is permitted to rotate by the torsional shear yieldability of bushings 31. However, the rigid mounting of arms 33 on the ends of shaft 29 will assure that both arms 33 will rotate the same angular distance that tube 29 is permitted to rotate by shear yieldability of the elastomeric bushings. Operation of the truck is as follows:

As the truck is accelerated by its motor, the acceleration forces are transmitted from axles through tied frames 7, rubber pads 10, transverse frame 9, and central bearing 13 to bolster 11. From the end portions 15 of bolster 11 these forces are transmitted by anchor links 37 to the lower ends of arms 33 to which the anchor links are pivotally secured. Since the upper ends of arms 33 are rigidly secured to shaft 29 and since the latter is mounted in brackets 25 by means of bushing 31, the shear yieldability of bushings 31 will permit shaft 29 and with its arms 33 to rotate sufficiently in the direction of acceleration to partially absorb some of the accelerating force and prevent its transmission in its entirely to underframe U, while the shear resistance of bushings 31 will limit the extent of rotation of shaft 29 and arms 33 and thus provide for the transmission of accelerating forces from the truck to the vehicle underframe U. Deceleration forces applied by the brake (not shown) would be accommodated and resisted similarly during transmission from the truck to the vehicle underframe. Tendencies of the bolster to swivel relative to the vehicle underframe are resisted by reason of the connection of anchors 37 to arms 33 rigidly mounted on shaft 29 whereby any longitudinal movement of either anchor 37 will be transmitted by its arm 33 through shaft 29 to the opposite arm 33 and the opposite anchor 37.

In the modified form of the invention shown in FIG. 5, shaft 29 is similarly journalled near its ends in bracket structure 41 depending from underframe U and the arms 33a are similarly rigidly mounted on the ends of shaft 29.

Arms 33a are formed at their sides with oppositely diverging radial surfaces 43 and bracket structure 41 is formed with depending projections 45 substantially at the level of surfaces 43 but spaced apart lengthwise of the vehicle therefrom on both sides of arm 33a. The surfaces of projections 45 opposing surfaces 43 mount the maximum cross section ends of elastomeric block 47 of "beehive" shape with their minimum cross section ends proximate to and adapted for engagement with surfaces 43 on arm 33a, so that any pivotal movement of arms 33 and shaft 29 responsive to acceleration or retardation forces transmitted to arms 33a by anchor links 37 will be accommodated but yieldably resisted by compression of beehive shaped blocks 47, the rate of such resistance varying upwardly from an initial minimum rate upon initial contact with surfaces 43 of arms 33a.

The invention may be modified in various respect as will occur to those skilled in the art and the exclusive use of all modifications as come within the scope of the appended claims is contemplated.

What is claimed is:

1. Railway vehicle structure comprising wheels, longitudinally spaced axles, truck structure supported on said axles, a bolster extending transversely of said truck structure and supported thereon for swiveling movements about a vertical axis at the center thereof, springs carried by the end portions of said bolster, vehicle underframe structure supported by said springs, a shaft extending transversely of the vehicle and supported from the underframe structure for rotation about its axis with respect thereto, said shaft being spaced lengthwise of the vehicle from said bolster and mounting at its ends substantially vertical arms, and separate substantially horizontal longitudinally extending anchor links at each side of the vehicle pivotally connected at their one end to said arms and at their other end to the ends of said bolster, and means yieldably resisting rotation of said shaft.

2. Railway vehicle structure according to claim 1 wherein said last named means comprises structure depending from said underframe and apertured to permit the passage therethrough of said shaft, there being an elastomeric bushing between said shaft and the peripheral surface of said apertures with its outer and inner surfaces held against rotation respectively with respect to said depending structure and said shaft whereby rotational movements of said shaft with respect of said depending structure are resisted by shear in said elastomeric material.

3. Railway vehicle structure according to claim 2 wherein there are a pair of said depending structures spaced apart a substantial distance transversely of said underframe and said arms are positioned on said shaft in proximate relation transversely of the vehicle with said depending structures.

4. Railway vehicle structure according to claim 1 wherein the end portions of said bolster are of gable shape and said springs are supported on the sloping surfaces thereof whereby to exert a component lengthwise of the vehicle opposing shifting of said bolster lengthwise of the vehicle with respect to said underframe.

5. Railway vehicle structure according to claim 1 wherein said means comprises opposite transverse radial surfaces on said shaft and blocks of elastomeric material supported on said underframe each with one of their surfaces in proximate relation with said radial surface for engagement therewith responsive to rotational movements of said arms whereby to yieldably oppose the latter.

6. Railway vehicle structure according to claim 5 in which the cross section of said elastomeric blocks varies between a minimum adjacent said radial surface to a maximum at their underframe support.

7. Means for transmitting longitudinal forces between a vehicle frame structure and a bolster structure extending transversely of said frame structure, comprising a transversely extending shaft journaled on one of said structures, substantially vertical radial arms rigid with said shaft and spaced lengthwise thereof, substantially horizontal longitudinally extending links pivotally secured at one end to said arms and at their other end to said other structure, and resilient means yieldably resisting rotation of said shaft.

8. Means according to claim 7 in which the journals of said shaft on said one structure includes elastomeric bushings.

9. Means according to claim 7 in which there are opposite transverse radial surfaces rigid with said shaft and blocks of elastomeric material are mounted on said one structure in opposing relation with said radial surfaces.

10. Means according to claim 9 in which the cross section of said blocks varies from a minimum adjacent said radial surfaces to a maximum at their connection to said one structure.

References Cited

UNITED STATES PATENTS

| 2,004,068 | 6/1935 | Woodling | 267—11 |
| 2,211,462 | 8/1940 | Hobson | 105—197 |
| 2,901,240 | 8/1959 | Fikse | 267—11 |
| 3,020,857 | 2/1962 | Dean | 105—199 |
| 3,181,479 | 5/1965 | Rumsey et al. | 105—197 X |

ARTHUR L. LA POINT, *Primary Examiner.*

H. BELTRAN, *Assistant Examiner.*

U.S. Cl. X.R.

105—197, 200